No. 635,581. Patented Oct. 24, 1899.
J. A. PATTERSON.
TWO ROW DISK CULTIVATOR.
(Application filed Feb. 6, 1899.)
(No Model.) 3 Sheets—Sheet 1.
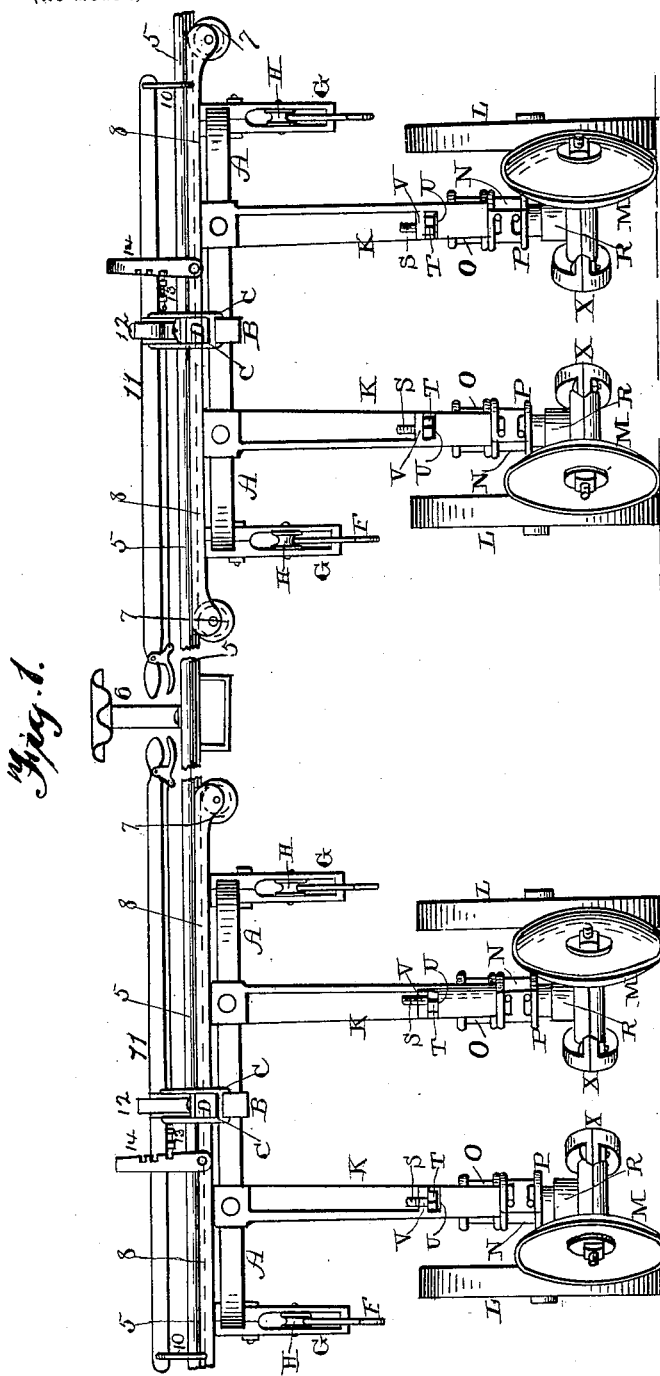
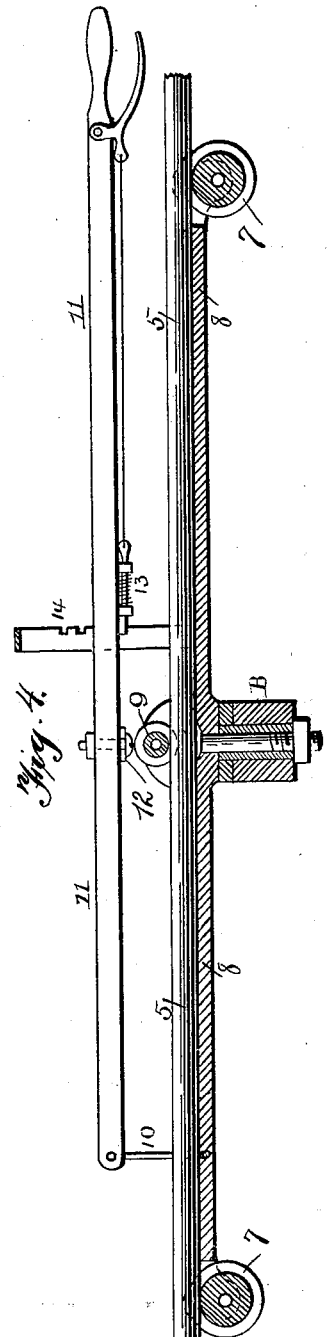
WITNESSES
Geo. E. Finch
Rosann Smith
INVENTOR
J. A. Patterson,
per Hy. W. Stackpole,
Attorney
THE NORRIS PETERS CO., PHOTO-LITHO., WASHINGTON, D. C.

No. 635,581. Patented Oct. 24, 1899.
J. A. PATTERSON.
TWO ROW DISK CULTIVATOR.
(Application filed Feb. 6, 1899.)
(No Model.) 3 Sheets—Sheet 2.
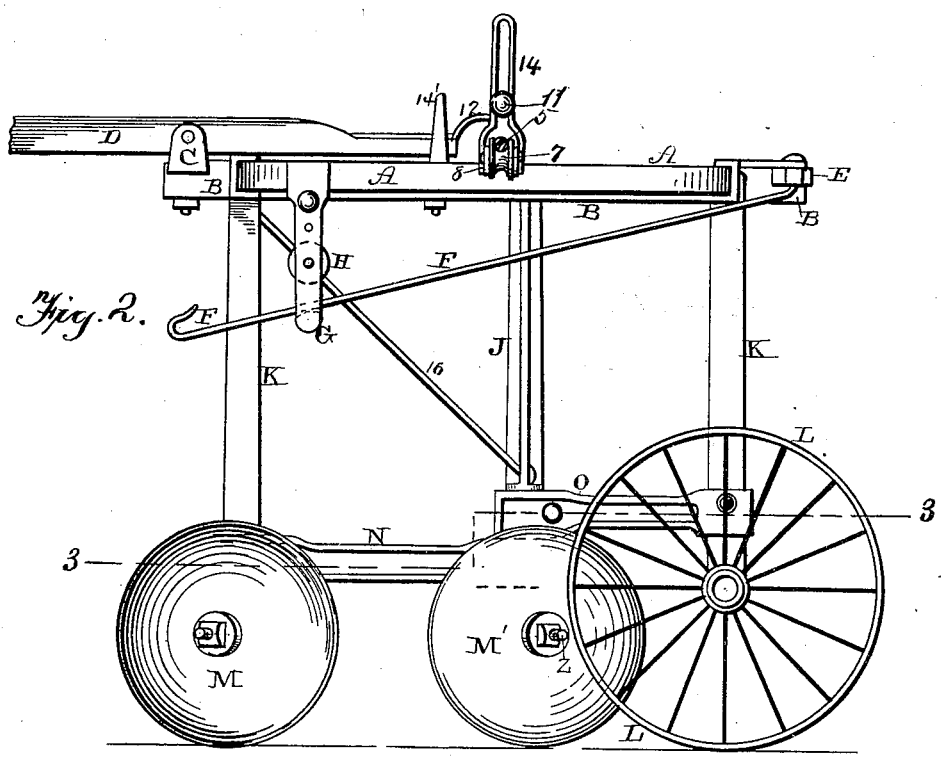
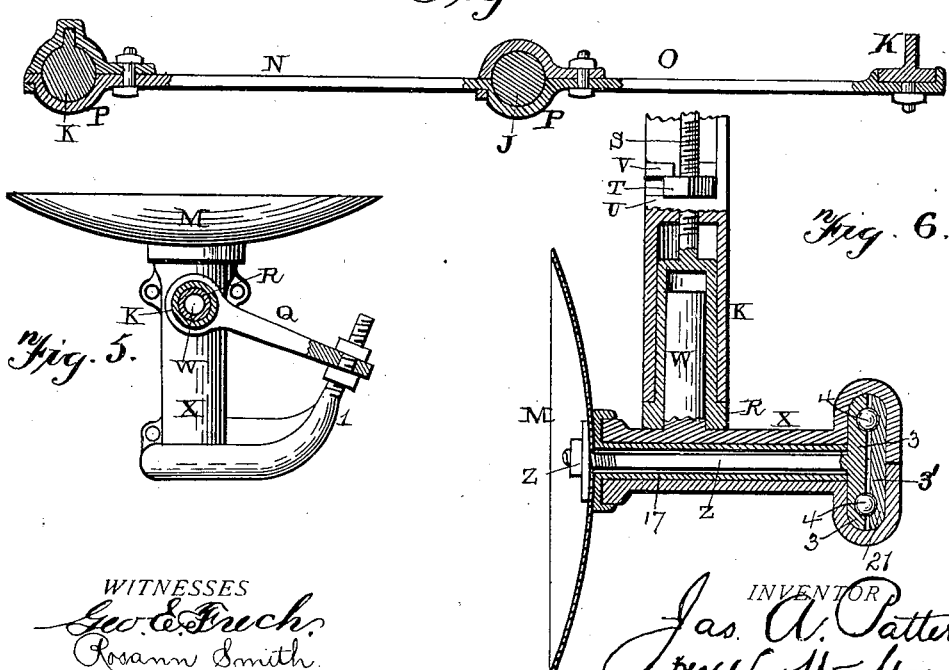
WITNESSES
Geo. E. Frech.
Rosann Smith.
INVENTOR
Jas. A. Patterson,
per Hy. W. Stackpole,
Attorney No. 635,581.  
J. A. PATTERSON.  
TWO ROW DISK CULTIVATOR.  
(Application filed Feb. 6, 1899.)
Patented Oct. 24, 1899.
(No Model.)
3 Sheets—Sheet 3.
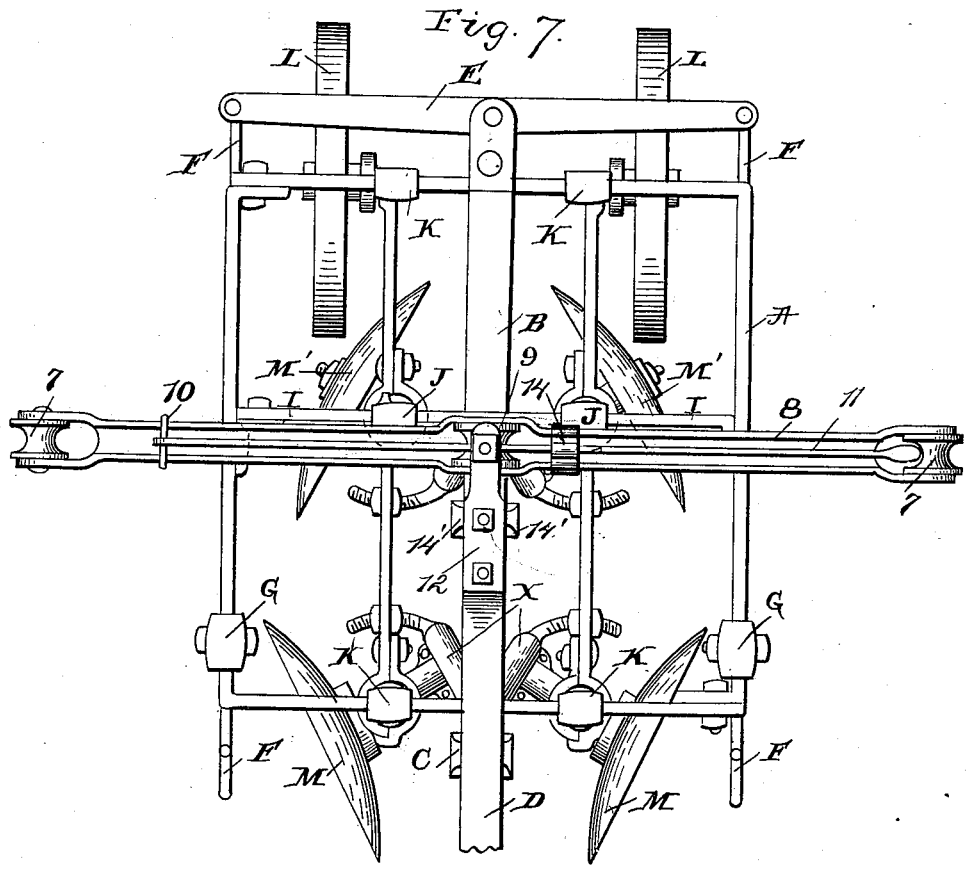

UNITED STATES PATENT OFFICE.

JAMES A. PATTERSON, OF CLIFTON, KANSAS.

TWO-ROW DISK CULTIVATOR.

SPECIFICATION forming part of Letters Patent No. 635,581, dated October 24, 1899.

Application filed February 6, 1899. Serial No. 704,765. (No model.)

*To all whom it may concern:*

Be it known that I, JAMES A. PATTERSON, a citizen of the United States, residing at Clifton, in the county of Clay and State of Kansas, have invented certain new and useful Improvements in Two-Row Disk Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in implements for cutting the weeds and cultivating the ground between rows of corn or other crops; and the objects of my improvements are to so construct a disk cultivator that the same shall be simply and easily adjusted and may be employed to cultivate two or more rows at one and the same time, cutting the weeds, and thoroughly stirring the ground around the plants and in the furrows without the usual danger of, even in hard ground, being diverted from the furrow so as to injure the plants; to make practicable with the one machine to cultivate around the plants the second and third times, and to so inclose the spindle and shaft within the hub that the bearings thereof, whether outward or inward, shall be within the enlarged portion of said hub, free from dirt and dust, and automatically lubricated by oil contained therein. I attain these objects by means of the mechanism hereinafter described, and illustrated in the accompanying drawings, in which—

Figure 1 is a view in perspective of two connected sections of my cultivator; Fig. 2, a side elevation of one section thereof; Fig. 3, a longitudinal sectional view of the bottom side rail through the dotted line 3 3 in Fig. 2; Fig. 4, a vertical sectional view of the traveler-bar used in connecting the two sections of the cultivator and the lever for raising a section thereof and showing the pivotal connection of the traveler with the machine; Fig. 5, a view of one of the disks, showing the manner of adjusting the angle of same. Fig. 6 is a sectional view showing the internal construction of the leg, foot, and hub and method of gaging depth of same. Fig. 7 is a plan view of one portion of the framework complete.

A represents a rectangular frame, which is preferably composed of two angular pieces, which are clamped or fastened together at diagonal corners either by bolts or any other suitable fastenings that may be preferred. Extending horizontally across this frame in a line with the forward movement of the machine is a cross-bar V, which serves as a support at its front end in front of the frame A for the casting C, upon which the tongue D is pivoted. Upon the rear end of the cross-bar in the rear of the frame is pivoted the equalizing-bar E, to opposite ends of which the draft-rods F are pivoted. Clamped to opposite forward ends of the frame A are the brackets G, through the lower ends of which the draft-rods are passed and by which the front ends of the draft-rods are supported. These brackets are provided with a series of perforations, and journaled in two of the perforations in each bracket is a roller H, which serves to limit the upward movement of the rods. Also extending across inside of the frame A and at right angles to the cross-bar B is a cross-bar I and from which depend two standards J. Also depending directly from the front and rear ends of the frame A are the four standards K, to the rear of two of which are secured in any suitable manner the driving-wheels L and to the lower ends of the front standards the two disks M. The lower ends of the two front standards are connected to the lower ends of the standards J by the side rail N, and the two rear standards K are secured to the two central ones J by the side pieces O. These standards are all preferably made of T-shaped bars, which are made hollow and rounded at their lower ends where they pass through the clamped sleeves P. The sleeves P, one-half of which are formed by the ends of the side rails N, the other half being formed of separate pieces, which are hooked upon the ends of the side rails and which after extending around the lower ends of the standards, as shown in Fig. 3, are bolted to the side rails. These side rails serve to brace the lower ends of the standards rigidly together and to make the frame strong and rigid.

Extending up into the hollow ends of the standards K are the sleeves R, from the upper ends of which project screw-rods S, and upon which screw-rods are placed the nuts T for the purpose of gaging the depth of the disks or holding the sleeves R in position. These nuts catch just above a shoulder U and under flanges V, formed upon the standards, so that the nut can have no vertical play. These sleeves have no turning movement whatever, and projecting rearward from their lower ends are the arms Q, which have perforations through their outer ends. Also extending up into the hollow sleeves R are the journals or spindles W of the bearings X for the disks Y. These bearings are formed of two parts, which are clamped together around the spindle 17, to which the disks are secured, by means of the shaft Z, and projecting from these bearings are the curved arms 1, which are screw-threaded at their outer ends where they pass through the arms Q. These arms 1 are screw-threaded at their outer ends and provided with suitable clamping-nuts, so that the angle at which the bearings X stand to the standards may be regulated at will. The disks, as shown in Fig. 2, are preferably placed at angles to each other, so as to cut close to the sides of the growing plants without injuring them. The shafts Z are provided at their inner ends with the disks 3, which revolve within the enlarged end of the bearing X and between the inner sides of the disks 3, which are grooved to receive them, and inside of the bearing-plates 3' are placed suitable balls 4, which cause the shafts to revolve with as little friction as possible.

As shown in Fig. 1, this machine consists of two separate and distinct frames, which are connected by a rod 5, which extends across their tops and supports the driver's seat 6. The rod 5 rests upon the antifriction-rollers 7 at each end of a cancaved pivoted rod 8, which extends across the top of one part of the frame. At the center of the rod 8 is placed a friction-roller 9, which is mounted higher than the one 7 and under which the rod 5 passes, as shown in Fig. 4, so as to prevent it from having any vertical play and becoming displaced. The opposite end of the rod 5 is similarly pivoted to the cross-bar B on the other frame. Loosely connected to the outer end of each of these pivoted rods 8, by means of the links 10, are the levers 11, which extend inwardly within easy reach of the driver upon the seat 6. Secured to each of the levers 11 is a plate 12, which is secured to the end of the tongue D. Also secured to each lever 11 is a spring-catch 13, which engages with the notched standards 14 and by means of which the lever 11 is held in any desired position. The plate 12 is pivotally connected to the lever, and by raising and lowering the lever the rear ends of the tongues D, which have a free rising-and-falling movement between the castings 14', secured to the cross-bar B, can be raised and lowered for the purpose of causing the disks to run shallower or deeper, as may be desired. The levers 11 are kept in a line with the concaved rod 8 by means of vertical guides which are loosely pivoted to the rod 8. When the driver raises the inner ends of the levers 11, the rear ends of the tongues D are correspondingly raised and their outer ends correspondingly depressed, and thus the disks are caused to run shallower, and when the free ends of the levers are depressed the inner ends of the tongues D are also depressed and their outer ends raised, thus causing the disks to run deeper.

As shown in Fig. 1, the standards J and K are braced together in pairs by means of the brace-rods 16.

As shown in Fig. 6, the bearings X have suitable sleeves 17 placed inside of them, and these sleeves receive the wear of the shafts. At the inner enlarged end of the bearing a suitable plate is placed between the disk 3 and the enlarged portion of the bearing, so as to receive the wear of the balls 4. In case the sleeve 17 or the plate should become worn or injured they can be easily replaced or repaired without having to do more than to separate the two parts of the bearing.

Having thus described my invention, I claim—

1. In a cultivator, a suitable framework, the three pairs of standards depending therefrom, the driving-wheels journaled upon the lower ends of the rear standards, the cross-bar B, the equalizing-rod pivoted upon the rear end, the draft-rods connected to the rear ends of the equalizing-rod, and suitable devices for supporting the front ends of the rods, combined with the disks journaled upon the lower ends of the two front pairs of standards, and means for regulating the angles at which the disks shall stand, substantially as shown.

2. In a cultivator, two separate and distinct frames, supporting-wheels for each portion of the frame, and two sets of disks mounted upon each portion of the frame, combined with a connecting-rod which extends across the two frames, a pivoted rod mounted upon one frame and forming a support for the connecting-rod, operating-levers connected one to the pivoted concaved rod, and the other to the connecting-rod, tongues pivoted upon the front ends of the frames, and connected to the levers, substantially as described.

3. In a cultivator, two separate and distinct frames, each mounted upon driving-wheels of its own, and each portion of the frame provided with suitable cultivating implements, combined with the connecting-rod for uniting the two portions of the frame, a pivoted rod mounted upon one portion of the frame, tongues pivoted upon the front ends of each of the frames, and means extending within the reach of the driver whereby the front ends of the frames can be raised and lowered at the will of the operator, substantially as set forth.

4. In a cultivator, a suitable frame, standards depending from the frame, and made hollow at their lower ends and provided with means for preventing an upward movement, sleeves screw-threaded at their upper ends and which are made to fit in the lower ends of the standards, the bearings provided with spindles or pivots, the shafts, and the disks secured to the outer ends of the shafts; the upper ends of the screw-threaded portions of the sleeve being made to pass through nuts which are prevented from having an upward movement by means formed upon the standards, substantially as specified.

5. In a cultivator, the bearings provided with screw-threaded arms, the shafts journaled therein, and the disks secured to the outer ends of the shafts, combined with the standards, sleeves placed in the lower ends of the standards and provided with perforated arms, and suitable means placed upon the screw-threaded ends of the arms whereby the disks are held at any desired angle to the standards, substantially as shown.

In testimony whereof I have affixed my signature in presence of two witnesses.

JAMES A. PATTERSON.

Witnesses:
   HY. W. STACKPOLE,
   E. J. FULLER.